Figure 1:
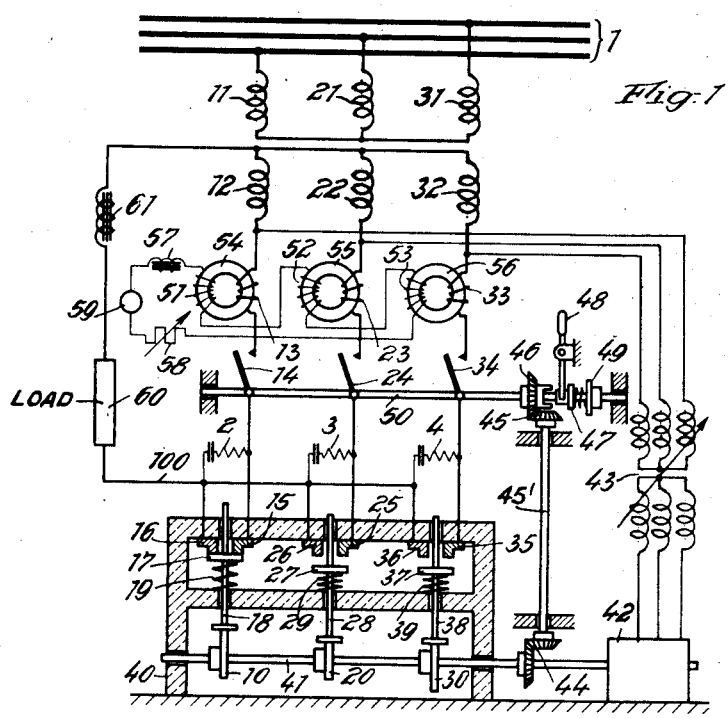

April 2, 1940.  F. KOPPELMANN ET AL  2,195,818
APPARATUS FOR CONVERTING CURRENTS
Filed March 30, 1937  3 Sheets-Sheet 1

Floris Koppelmann
Hans Joachim Mattern
Inventors

April 2, 1940.  F. KOPPELMANN ET AL  2,195,818
APPARATUS FOR CONVERTING CURRENTS
Filed March 30, 1937   3 Sheets-Sheet 3
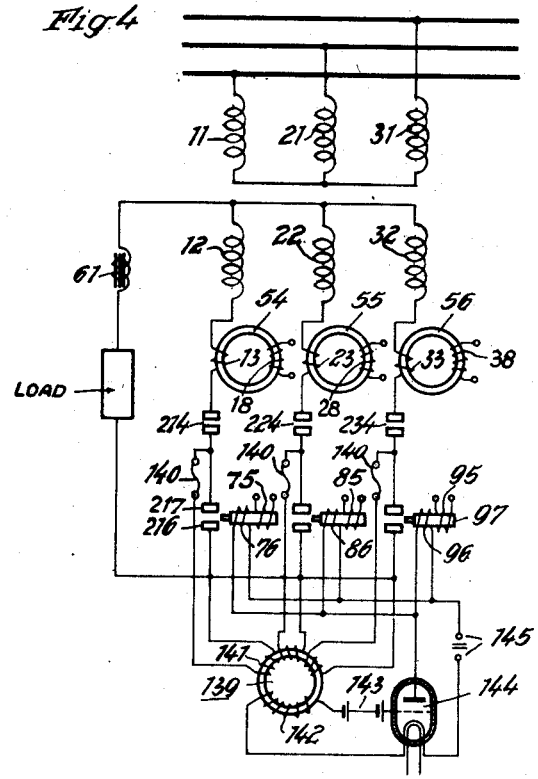
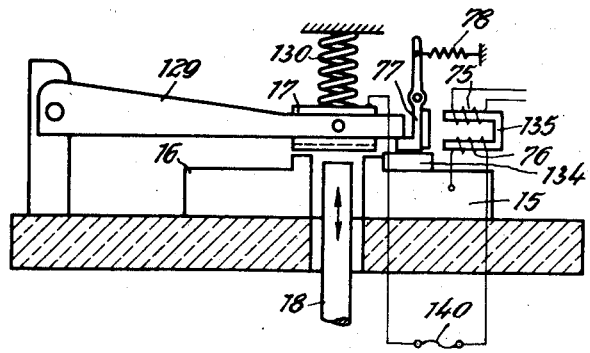
Floris Koppelmann
Hans Joachim Mattern
Inventors
by Knight Watty
Attys Patented Apr. 2, 1940

2,195,818

UNITED STATES PATENT OFFICE 2,195,818

APPARATUS FOR CONVERTING CURRENTS

Floris Koppelmann, Berlin-Siemensstadt, and Hans Joachim Mattern, Berlin-Wilmersdorf, Germany, assignors to Siemens-Schuckertwerke Aktiengesellschaft, Berlin-Siemensstadt, Germany, a corporation of Germany Application March 30, 1937, Serial No. 133,758
In Germany June 30, 1936

14 Claims. (Cl. 175—364)

Our invention relates to apparatus for converting currents, for instance, for rectifying alternating current, converting alternating current into direct current, or converting alternating current of one frequency into alternating current of another frequency by means of mechanical contact circuit breakers. More specifically, our invention relates to apparatus of the above-indicated character in which inductors are connected in series with the circuit breakers and in which these inductors vary the impedance in such a manner that the intensity of the current to be interrupted is considerably reduced within a time interval within which the contacts are broken. Such apparatus are described in our copending applications: Serial No. 114,965, filed on December 9, 1936, and Serial No. 122,232, filed on January 25, 1937, and an application preparatory executed February 26, 1937.

In such converters difficulties may arise in the case of irregular operating conditions. This is particularly true when starting the converters, especially if various phases are present which are to be interrupted at different times. If the circuit breakers when putting the converters into operation, are at first driven synchronously without being loaded electrically, and if then the breakers are connected to the supply circuit, it may happen that owing to transient equalizing phenomena, the moments at which the current passes through the zero value are so shifted with respect to the phase position of these zero moments as occurring under normal operating conditions that an arcing occurs at the contacts which may heavily damage the contact device. In order to avoid such damage, only a fraction of the supply circuit voltage may be first applied to the contacts of the switching converter by means of special starting devices and the voltage may then be gradually increased to the full value. This method is, however, rather complicated.

Other difficulties may arise in the above-mentioned converters if considerable asymmetries, for instance, due to grounds occur in the alternating circuit connected to the converter. In this case, the contacts of the circuit breakers are endangered by the formation of arcs during the switching-out operation. This is particularly the case if the load of the converter fluctuates considerably or if mechanical disturbances in the contact system occur.

An object of our invention consists in removing the difficulties due to the above-mentioned irregularities of operation and in preventing the contacts of the converter from being damaged.

More specifically, an object of our invention is to simplify and to accelerate the starting of converters for rectifying alternating current or converting direct current to alternating current by means of mechanical contact circuit breakers.

Another object of our invention consists in preventing, by means of a high-speed protective device, damaging of the contacts by the formation of arcs.

Figure 3:
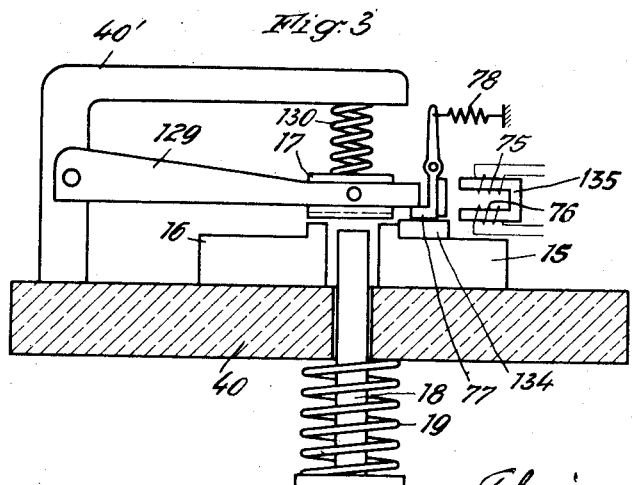
Figure 2:
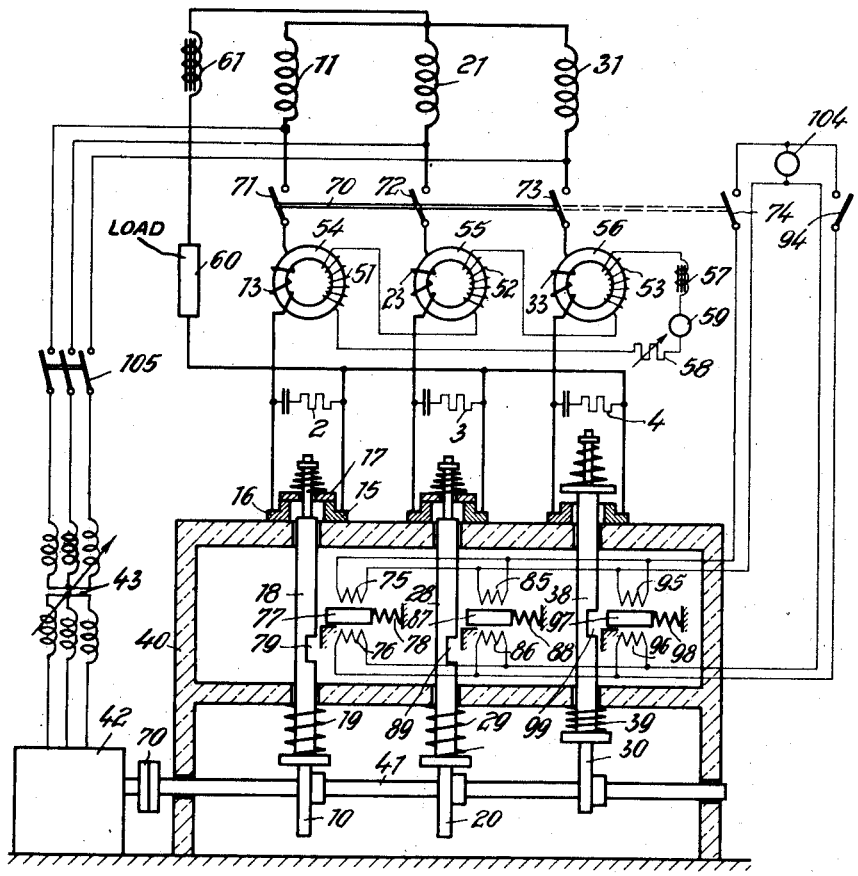

For a better understanding of our invention reference may be had to the accompanying drawings, in which Fig. 1 shows a switching gear for rectifying three-phase alternating current. This switching gear is provided according to the invention with a device which facilitates putting it into operation, since it permits a closure of the circuits by the circuit breakers only if the position of phase of the common drive of the circuit breakers has attained the desired magnitude. Fig. 2 shows another embodiment of the switching gear used for the same purpose. Fig. 3 shows a modification of the mechanical part of a protective device designed according to the invention which may be employed in combination with the arrangement shown in Fig. 2. Fig. 4 shows another form of the invention for protecting the contacts against arcs, whereas Fig. 5 shows the mechanical part of a protective device employed in an arrangement similar to that of Fig. 4.

In Fig. 1, I denotes a three-phase current supply circuit. The primary windings 11, 21, 31 of a transformer whose secondary windings are denoted by the numerals 12, 22, 32 are connected to the supply circuit 1. To each secondary winding is connected a variable impedance consisting of an inductor 13, 23, 33. A switch having three poles 14, 24, 34 is arranged in series with the reactors. The break contacts of a synchronously driven switching gear are respectively connected in series with the three poles of the switch. Each circuit breaker of the switching gear has two stationary contacts 15, 16; 25, 26 and 35, 36 respectively, which are conductively connected with one another in the closed position by movable contacts 17, 27, 37 respectively. One member of each pair of break contacts is connected to a common conductor 100. During correct operation of the contacts, direct current flows between this conductor and the neutral point of the secondary side of the transformer. In the circuit 100 is inserted a reactance coil 61 and the useful load 60.

Current paths 2, 3 and 4 forming apparent resistances are respectively parallel connected to the members of each pair of the break contacts. The current path serves to reduce the voltage present between the contacts of the circuit breakers to such an extent as to prevent an arcing when the contacts are opened.

The magnet bodies 54, 55, 56 of the inductors 13, 23, 33 are so designed that they are already saturated at low intensities of current of, for instance, 1 amp. The magnet bodies consist of a magnetic material, the magnetization curve of which presents a sharp saturation bend. By the cooperation of the series impedances and of the parallel paths 2, 3, 4, the intensity of current and the voltage across the break contacts is periodically reduced during a time interval within which the circuit breakers of the switching gear are opened.

The magnet bodies of the inductors are provided, respectively with auxiliary windings 51, 52, 53. These windings are series-connected through an inductance coil 57 and a rheostat 58 to a power source 59, for instance to a direct current source or to an alternating current source having the same frequency as the current to be converted. By regulating the resistance 58, the magnetic bias of the three reactors may be varied. In this manner, the time interval within which the intensity of current is reduced owing to the increase in inductance of the inductors, is varied with respect to the cycle of the alternating current to be interrupted.

The movable contacts 17, 27 and 37 are each driven by means of a tappet 18, 28 and 38 respectively. The movable contacts are arranged on these tappets. Tension springs 19, 29, 39, acting as energy accumulators, tend to hold the tappets and the contacts in the open position. A shaft 41 is rotatably mounted in the frame 40 of the switching gear. Cams 10, 20 and 30 are arranged on the shaft 41. By these cams, the tappets 18, 28 and 38 respectively are raised in succession and are again lowered under the action of the aforementioned springs. The shaft 41 is driven by a synchronous motor 42 connected to the secondary side 12, 22, 32 of the main transformer through a regulating transformer 43. By the regulating transformer 43, the moment at which the contacts of each circuit breaker are broken may be shifted with respect to the cycle of the alternating voltage. By means of the regulating members 58 and 43 it is, therefore, possible to open the contacts under normal operating conditions within that time interval within which the intensity of current in each phase is so reduced owing to the effect of the reactors and the parallel paths 2, 3, 4 as to avoid arcing.

Shaft 50 represents the operating member of the switches 14, 24 and 34. The drawings indicate the mechanical relation between these switches and shaft 50 schematically. It is to be understood that the rotation of shaft 50 results in closing the switches and in leaving them in closed position during the further operation of the device. Shaft 50 carries a beveled gear 46 meshing with a beveled gear 45. Gear 46 is rotatable relative to shaft 50 while gear 45 is firmly mounted on an intermediate shaft 45' whose other end is positively coupled with the main shaft 41 by means of bevel gears 44. Hence, when in operation, the gear 46 rotates with the same angular speed as the main shaft. The hub portion of gear 46 is designed as member of a clutch coupling whose other member 47 is slidable but non-rotatable relative to shaft 50. Accordingly, when the assembly of switches 14, 24 and 34 is in open position, as represented in Fig. 1, the clutch member 47 has a definite angular position, while the gear 46 in a definite angular relation to the main shaft 41 may run idle on shaft 50. A spring abutting against a disc 49 firmly mounted on shaft 50 tends to move clutch member 47 towards gear 46. Such movement, however, is prevented by a mechanism having a handle 48. If this handle is actuated, the clutch member 47 is released so that now the spring becomes effective. The clutch coupling is so designed, that its two members 47 and 46 engage each other in only one relative angular position. Since the clutch member formed by gear 46 rotates constantly in a definite phase relation to the rotation of the main shaft and the operation of the contacts 17, 27 and 37, the moment when the clutch becomes effective and closes the switch assembly 14, 24 and 34 has also a definite phase relation to the breaker operation and to the cycle of the alternating current which energizes the synchronous motor 42 and of the alternating current to be interrupted by the contacts 17, 27 and 37. This phase relation is so adjusted by means of phase shifter 43 and resistor 58 that the switching-in of the switches 14, 24 and 34 occurs in a proper relation to the desaturation of the reactors 54, 55 and 56 and takes place at a moment at which only one of the three circuit breakers is closed, whereas the other two are open. In this manner, the switching-in operation is prevented when two breaker contacts are closed simultaneously and if a path for a short-circuit current would be closed, for instance, through the parts 12, 13, 14, 15, 17, 16, 100, 26, 27, 25, 24, 23, 22, 12. Owing to the absence of such a path for the short-circuit current with the aforedescribed arrangement, all three poles of the switch 14, 24, 34 may be switched in simultaneously. The switching-in operation then has the same effect as a considerable load fluctuation. A shifting of the points at which the current passes the zero value which under given conditions may occur in this case, is compensated for by the series-arranged impedances, particularly if the supply circuit 1 has a stable voltage characteristic so that load fluctuations exert only a small influence on the value of the voltage.

After having started the device, the shaft 50, having no further function until the next starting operation, may run idle or may be brought to rest by disengaging the coupling 47 by hand or by automatic means. Before any new start, the switches 14, 24 and 34 are to be reset so as to become operable again by shaft 50.

The putting into operation is more difficult in the case of complicated conditions, i. e., particularly, at a high voltage at which the flattening of the current curve in the neighborhood of the point at which the current passes through the zero value is limited to a smaller range of the cycle, since otherwise, the current reducing impedance would become too large, and in the case of a varying voltage characteristic of the power source, for instance, when supplying a rectifier with energy from a second generator of about the same output.

These difficulties may be removed according to the invention by applying the voltage to each single pole at different moments. In this case care must be taken that all moments at which the contacts are closed lie within the time interval of a single cycle of the alternating voltage. According to the invention, the operation of the switching gear is simplified in the manner that the signal for switching-in the three poles of the switch is simultaneously transmitted, for instance, by means of a single push button.

Such an embodiment is shown in Fig. 2. The secondary windings 11, 21, 31 of the main transformer are connected to the contacts of the three circuit breakers through the switches 71, 72, 73 and the reactors 13, 23, 33 respectively. The connection is carried out in substantially the same manner as shown in Fig. 1, similar numerals of reference of Fig. 2 corresponding to similar parts of Fig. 1. The arrangement shown in Fig. 2 differs from that in Fig. 1 by the following features: Each of the three circuit breakers is provided with a latch 77, 87, 97 respectively. A spring 78, 88, 98 is respectively provided for each latch tending to press it against the tappet of the appertaining circuit breaker. Each tappet is provided with a recess 79, 89, 99 with which the appertaining latch is arranged to come into engagement. The length of each recess is greater than the height of its latch. The recesses further are so arranged in the tappets that the latches may catch into the recesses only when the tappets reach their highest position, as for instance tappet 38. Each latch is provided with a winding 75, 85 and 95, respectively. These windings are connected to a power source 104, for instance a direct current source through a switch 74, preferably a push button, and are so dimensioned as to cause, when energized, a withdrawal of the latches from the recesses only if the respective tappet is raised. This action will be better understood by the following explanation. Suppose the device is in its position of rest wherein latches 77, 87 and 97 have caught the recesses 79, 89 and 99, respectively, and thereby locked the tappets in their highest position, thus maintaining the contact breakers in open state. In this position, the weight of the tappets and the pressure exerted by the tappet springs 19, 29 and 39, respectively, act upon the latches, thus pressing each latch against its support. If the magnets 75, 85 and 95 are now energized, their magnetic force is too weak to withdraw the latches against the locking action of the tappets and the tappet springs. However, as soon as a tappet is raised by its cam 10, 20 or 30, this locking action is released and the latch is magnetically moved into its open position, shown in Figure 2. Since the three tappets reach their highest positions successively, the latches are also withdrawn in the same succession, in spite of the fact that the three magnets 75, 85 and 95 are energized simultaneously.

In the arrangement shown in Fig. 2 each latch is further provided with an auxiliary winding 76, 86 and 96 respectively, connected to the power source 104 through a switch 94. When the switch 94 is closed, the windings 76, 86 and 96 act in opposition to the windings 75, 85 and 95 so that the magnet is demagnetized and the springs 78, 88, and 98 become active and move the latches. By the use of such demagnetizing windings, the advantage is obtained in that the latches can be brought again into their locking position more rapidly than is possible without such auxiliary windings by only disconnecting the switch 74. The invention may, however, be carried into practice without the use of the windings 76, 86, 96.

The arrangement is put into operation in the following manner:

The operator first closes the switch 105, thereby energizing the synchronous motor 42. The cams 10, 20 and 30 are now rotated but the tappets 18, 28 and 38 are firmly held in the open position by the latches 77, 87, 97. Now the operator closes by hand the switch assembly, 70, 71, 72, 73, whereby the three circuit breakers are simultaneously connected with the transformer windings 11, 21 and 31 and thus now put under tension. The tappets 18, 28 and 38 are still held in the open position. The last manual operation to be performed by the operator is to close switch 74. The further operation is automatic. The closure of switch 74 causes the windings 75, 85 and 95 to be energized. Thereby the three latches are successively withdrawn from the recesses 79, 89 and 99, respectively, and the tappets are released and begin to operate their break contacts. The voltage is, as explained before, switched in at a moment at which only one circuit breaker is closed and at which the conditions for the switching-in are most favorable. Furthermore, the contacts of the three circuit breakers become effective in the proper sequence, i. e., in that sequence in which they also operate under normal working conditions. The arrangement permits, therefore, a dangerless and rapid starting of its operation.

Fig. 3 shows a detailed construction of the locking device. Some parts of the locking device are designated by the same numerals of reference as in Fig. 2 so that it will be easily apparent in which manner the locking device is combined with the entire arrangement.

In Figs. 3, 15 and 16 are the two stationary contacts of a circuit breaker to which the current is supplied through flexible leads. Movable bands are employed in the case of very high intensities of current, for instance, of the order of $10^3$ amp. in order that no disturbing forces are exerted on the contacts which might prevent an intimate engagement of the contacts. The circuit is closed by the movable contact bridge 17. This bridge is pivotally mounted on a lever 129, secured to an arm 40' of the frame 40. Between the arm 40' and the contact bridge 17 is arranged a spring 130 which tends to press the contact bridge 17 against the stationary contacts 15 and 16. The tappet 18, when reciprocated by the synchronous driving, actuates the contact bridge 17 so as to close and to open the contact between the stationary contact elements 15 and 16 in the desired rhythm. Before starting the converting device, the engagement of the contact bridge with the stationary contacts is, however, prevented by the movable latch 77 which under the action of a spring 78 catches between the end of the lever 129 and a support 134. A magnet 135 energized by the winding 75 opposes the force of the spring 78. The magnetic force is, however, so chosen that it does not suffice to overcome the force of the spring. The magnetic force may be increased by means of a second energizing winding 76. But even then the resultant magnetic force is not sufficient to withdraw the latch 77 as long as the lever 129 rests thereon. Only when the synchronously controlled tappet 18 raises the contact bridge 17, for instance, up to the dash and dot line the latch 77 can be released and withdrawn by the magnet 135. The auxiliary winding 76 may be used for setting the converter out of operation. For this purpose, the winding 76 is deenergized or is supplied with current flowing in the opposite direction. The latch 77 then comes into engagement with the lever 129 as soon as the contact bridge 17 is sufficiently moved in the upward direction by the tappet 31.

The putting into operation as already mentioned is effected in such a manner that the synchronous drive of the tappet 18 is switched in first. Then the stationary contacts of all the break contacts are connected with the supply circuit. The contact bridge 17 and the corresponding bridges of the other contact breaks are, however, still held in the open position by the latches. If now the magnet 135 is energized, the latches are withdrawn one after the other in proper sequence and the operation is started in the same manner as described above with respect to Fig. 2. The above-mentioned connection of the circuit breakers with the supply circuit and the energization of the magnet 135 may be brought about simultaneously by a single signaling or operating member; for instance, the switch 74 shown in Fig. 2 may be combined with the switch 70, 71, 72, 73 to a single unit.

Figs. 4 and 5 show devices according to the invention which are provided with a protective device for automatically disconnecting the voltage in cases of disturbances due to short-circuits, grounds or other irregularities of operation which cause an arcing between the contacts.

The arrangement shown in Fig. 4 is designed in part in the same manner as the arrangement shown in Figs. 1 and 2. Also in the arrangement shown in Fig. 4 inductors 54, 55, 56 are employed which maintain the current when passing through the zero value at a value below the magnitude required for maintaining a stable arc during a time interval sufficient to open the contacts. The interruption is, therefore, effected under normal working conditions without causing sparks. The reactors are provided with a second winding 18, 28 and 38, respectively, by means of which the reactors, if desired, may be biased by a power source not shown. By varying the magnetic bias the practically dead interval during which the switching reactor is unsaturated may be shifted within a certain range with respect to the moment at which the current passes through the zero value, whereby the voltage of the apparatus may be controlled as set forth in the aforecited copending application, Serial No. 114,965, filed December 9, 1936.

Further, in series with the main circuit breakers 216, 217, etc. are arranged auxiliary circuit breakers 214, 224, and 234 respectively, which are controlled in the same rhythm. A fuse 140, serving as a high speed interrupting device, is parallel connected to each main circuit breaker.

So long as the two series-connected circuit breakers operate properly in each phase no current flows through the parallel-connected fuse 140, since when, for instance, the contacts 216 and 217 are closed and carry current, also the auxiliary contacts 214 are simultaneously closed so that the fuse is normally relieved of the operating current and may be rated for a very small current which amounts only to a fraction of the operating current of the switching converter. If a disturbance occurs which causes the formation of an arc upon the opening of the contacts 216 and 217 the current carried by the arc passes through the parallel-connected fuse 140, since the contact 214 is also open, and blows the fuse in a very short time before the arc current may cause serious trouble. At the same time the blowing of the fuse releases a locking device which prevents the circuit from being closed again.

A detailed construction of such a locking device is shown in Fig. 5. In this figure 15 and 16 denote the two stationary contacts to which current is supplied. The circuit is periodically closed and opened by the movable contact bridge 17 actuated by the tappet 18. The device is otherwise designed in the same manner as that shown in Fig. 3 except that the exciting winding 76 of the magnet 135 is series-connected to a fuse 140 and is arranged together with the latter in parallel relation to the breaking gap between the contact bridge 17 and the contact 15.

If a disturbance occurs which causes the formation of an arc in the breaking gap between the contact bridge 17 and the contact 16, the current blows the fuse 140, thus preventing a formation of an arc. The winding 76 is so dimensioned that the current, flowing through the fuse until it is blown, weakens or neutralizes the field induced in the winding 76 by the winding 75. Consequently, the latch 77 under the action of spring 78 comes into engagement upon the following opening of the contacts with the free end of arm 129 as shown in the drawing so that the contact bridge 17 can no longer come into contact with the stationary contacts 15 and 16. If three or more circuit breakers, according to Fig. 5, are united to a polyphase converter in a similar way as presented by Fig. 2, this converter would have the property that each of its circuit breakers in case of a disturbance effects its own stopping only and does not directly influence the other breakers.

In contrast thereto, the arrangement shown in Fig. 4 constitutes a particular combination in which each contact breaker of the polyphase converting device is capable of releasing all other locking devices. In this arrangement, one of a series of primary windings 141 of a common auxiliary transformer 139 is series-connected with each fuse 140. The auxiliary transformer 139 has only one secondary winding 142 which feeds all releasing coils 76, 86, 96 simultaneously.

In many cases it is necessary to insert in the control circuit an amplifier device which is also schematically shown in Fig. 4. To the secondary winding 142 of the auxiliary transformer 139 is connected the grid circuit of a discharge vessel 144, for instance a tube with a controlled arc or glow discharge, whose anodes lie in the circuit of the three parallel-connected releasing coils 76, 86 and 96, the circuit being supplied with direct current through the terminals 145. The grid of the discharge vessel 144 is impressed by a direct-current battery 143 with a biasing potential which lies immediately below its operating voltage. The magnetic core of the auxiliary transformer 139 is made of iron of high permeability similar to the cores 54, 55 and 56 of the reactors. In this manner, notwithstanding the smaller number of turns of the auxiliary transformer, a comparatively high voltage surge is attained both upon an increase and upon an interruption of the current flowing through the fuse. The above-mentioned two voltage surges have opposite directions. The grid bias of the discharge vessel 144 is, therefore, always increased by either current surge irrespective of the direction of the arc current, thereby igniting the discharge tube.

The locking device may be at the same time employed as a switching device for putting into operation the converter as is the case in the embodiments shown in Figs. 2 and 3.

The invention may be also used for other often actuated circuit breakers which are to be started or stopped under certain operating conditions.

We claim as our invention:

1. An arrangement for periodically interrupting alternating current, particularly for the purpose of rectifying alternating current, converting direct current into alternating current or converting alternating current of one frequency into alternating current of another frequency, comprising for each phase of the current to be interrupted a circuit breaker having at least one stationary and one movable contact, driving means for actuating said movable contacts successively in synchronism with the alternating current to be interrupted, a variable impedance connected in series with each circuit breaker, said impedance being designed for periodically increasing its impedance value at low intensities of the current to be interrupted, and a protective device for preventing the switching-in of the current by said circuit breakers in response to undesired operating conditions of the current to be interrupted, said protective device comprising means for establishing a temporary mechanical connection with said driving means in order to bring the operation of said protective device into time relation to the operation of said driving means.

2. An arrangement for periodically interrupting alternating current, particularly for the purpose of rectifying alternating current, converting direct current into alternating current or converting alternating current of one frequency into alternating current of another frequency, comprising for each phase of the current to be interrupted a circuit breaker having at least one stationary and one movable contact, driving means for actuating said movable contacts successively in synchronism with the alternating current to be interrupted, an inductor series-connected with each of said circuit breakers, said inductor having a magnetic body designed to be desultorily saturated at low current intensities so as to increase the inductance of said inductor during a time interval including the zero value of said current to be interrupted, and a protective device for preventing the switching-in of the current by said interrupters in response to departures of the opening moment of said contacts from said time interval, said protective device comprising means for establishing a temporary mechanical connection with said driving means in order to bring the operation of said protective device into time relation to the operation of said driving means.

3. An arrangement for periodically interrupting alternating current, particularly for the purpose of rectifying alternating current, converting direct current into alternating current or converting alternating current of one frequency into alternating current of another frequency, comprising for each phase of the current to be interrupted a circuit breaker having at least one stationary and one movable contact, driving means for actuating said movable contacts successively in synchronism with the alternating current to be interrupted, a variable impedance connected in series with each circuit breaker, said impedance being designed for periodically increasing its impedance value at low intensities of the current to be interrupted, and a protective device for preventing the switching-in of the current by said circuit breakers in response to departures of the opening moments of said contacts from the periods at which said impedance has said increased impedance value, said device including an operating circuit connected across the contacts of at least one of said circuit breakers in order to actuate said device in response to discharges of a given minimum intensity between the open contacts of said circuit breaker.

4. An arrangement for periodically interrupting alternating current, particularly for the purpose of rectifying alternating current, converting direct current into alternating current or converting alternating current of one frequency into alternating current of another frequency, comprising for each phase of the current to be interrupted a circuit breaker having at least one stationary and one movable contact, a motor for actuating said circuit breakers in synchronism with the current to be interrupted, a driving mechanism for transmitting the movement from said motor to said movable contacts, a variable impedance connected in series with each circuit breaker, said impedance being designed for periodically increasing its impedance value at low intensities of the current to be interrupted, a protective device for preventing the switching-in of the current by said circuit breakers in response to undesired operating conditions of the current to be interrupted, and a coupling gear disposed between said protective device and said driving mechanism, said coupling gear being designed to establish an operative connection only in a given phase position of said mechanism.

5. An arrangement for periodically interrupting alternating current, particularly for the purpose of rectifying alternating current, converting direct current into alternating current or converting alternating current of one frequency into alternating current of another frequency, comprising for each phase of the current to be interrupted a circuit breaker having reciprocatory contacts, a driving mechanism for periodically moving said contacts successively into their open position in synchronism with the current to be interrupted, means provided on said circuit breakers for returning said contacts to their closing position, a variable impedance connected in series with each circuit breaker, said impedance being designed for periodically increasing its impedance value at low intensities of the current to be interrupted, and a protective device for preventing the switching-in of the current by said circuit breakers in response to undesired operating conditions of the current to be interrupted, said device comprising a lock disposed on each circuit breaker for holding said contacts in open position against the action of said returning means and means for releasing said locks successively in the sequence of the phase currents flowing through the respective breakers.

6. An arrangement for periodically interrupting alternating current, particularly for the purpose of rectifying alternating current, converting direct current into alternating current or converting alternating current of another frequency, comprising for each phase of the current to be interrupted a circuit breaker having reciprocatory contacts, a driving mechanism for periodically moving said contacts successively into their open position in synchronism with the current to be interrupted, means provided on said circuit breakers for returning said contacts to their closing position, and a protective device for preventing the switching-in of the current by said circuit breakers in response to undesired operating conditions of the current to be interrupted, said device comprising a locking member for blocking said contacts in their open position in opposition to said returning means, a releasing winding and an operating circuit having a current source and a releasing switch connected to said releasing winding, said protective device being designed to allow a release of each locking member by said releasing winding only in the open position of the contact blocked by said locking member.

7. An arrangement for periodically interrupting alternating current, particularly for the purpose of rectifying alternating current, converting direct current into alternating current or converting alternating current of one frequency into alternating current of another frequency, comprising for each phase of the current to be interrupted a circuit breaker having at least one stationary and one movable contact, driving means for actuating said movable contacts successively in synchronism with the alternating current to be interrupted, a variable impedance connected in series with each circuit breaker, said impedance being designed for periodically increasing its impedance value at low intensities of the current to be interrupted, a switch series-connected with said circuit breakers, and an operative connection between said switch and said driving means for closing said switch in dependency upon a given phase position of said driving means, whereby when starting the operation of said arrangement the voltage is supplied to said circuit breakers at a given phase position of the contact movement with respect to the current cycle.

8. An arrangement for periodically interrupting alternating current, particularly for the purpose of rectifying alternating current, converting direct current into alternating current or converting alternating current of one frequency into alternating current of another frequency, comprising two simultaneously operating synchronous circuit breakers series connected in each phase of the circuit to be interrupted, a variable impedance connected in series in each of said phases, said impedance being designed for periodically increasing its impedance value at low intensities of the current to be interrupted, a protective device for preventing the switching-in of the current by said circuit breakers, a circuit arrangement operatively connected with said protective device, and a high speed interrupter associated with said circuit arrangement and connected in each phase in a circuit arranged in parallel to one of said two circuit breakers in order to actuate said protective device in response to the occurrence of discharge currents between the opening contacts of said latter circuit breaker.

9. An arrangement for periodically interrupting alternating current, particularly for the purpose of rectifying alternating current, converting direct current into alternating current or converting alternating current of one frequency into alternating current of another frequency, comprising for each phase of the current to be interrupted a circuit breaker having two stationary contacts and a movable contact for bridging said stationary contacts so as to form two series-arranging breaking gaps, driving means for actuating said movable contacts successively in synchronism with the alternating current to be interrupted, a variable impedance connected in series with each circuit breaker, said impedance being designed for periodically increasing its impedance value at low intensities of the current to be interrupted, a protective device for preventing the closing movement of said movable contacts, and controlling means arranged in parallel relation with respect to one of said breaking gaps, said controlling means being operatively connected with said protective device and responsive to the occurrence of discharge currents of a given minimum value in said parallel arranged gap.

10. An arrangement for periodically interrupting alternating current, particularly for the purpose of rectifying alternating current, converting direct current into alternating current or converting alternating current of one frequency into alternating current of another frequency, comprising for each phase of the current to be interrupted a circuit breaker having at least one stationary and one movable contact, driving means for actuating said movable contacts successively in synchronism with the alternating current to be interrupted, a variable impedance connected in series with each circuit breaker, said impedance being designed for periodically increasing its impedance value at low intensities of the current to be interrupted, a protective device associated with each of said circuit breakers for preventing the switching-in of the current by said circuit breaker in response to undesired operating conditions, said protective device comprising means for establishing a temporary mechanical connection with said driving means in order to bring the operation of said protective device in time relation to the operation of said driving means, and electric means for operatively connecting the protective devices of the different circuit breakers with one another, in order to actuate all the other devices upon the operation of one device.

11. An arrangement for periodically interrupting alternating current, particularly for the purpose of rectifying alternating current, converting direct current into alternating current or converting alternating current of one frequency into alternating current of another frequency, comprising for each phase of the current to be interrupted a circuit breaker having reciprocatory contacts, a driving mechanism for periodically moving said contacts successively into their open position in synchronism with the current to be interrupted, an energy accumulator provided on each of said circuit breakers for returning said contact into closing position, a locking device associated with each circuit breaker and designed for preventing in opposition to said energy accumulator the closing movement of said movable contact, each of said locking devices having a latch for blocking said contact in its open position and a magnetic winding for releasing said latch, an auxiliary transformer having a secondary winding connected with said magnetic windings, and at least one control circuit connected with a primary winding of said transformer and arranged in parallel relation to one of said circuit breakers, said control circuit being designed to cause the energizing of said magnetic windings so as to allow said latches to block said contacts in response to the occurrence of a discharge current of a given minimum intensity between the opening contacts of said parallel arranged circuit breaker.

12. An arrangement for periodically interrupting alternating current, particularly for the purpose of rectifying alternating current, converting direct current into alternating current or converting alternating current of one frequency into alternating current of another frequency, comprising for each phase of the current to be interrupted a circuit breaker having reciprocatory contacts, a driving mechanism for periodically moving said contacts successively into their open position in synchronism with the current to be interrupted, an energy accumulator provided on each of said circuit breakers for returning said contact into closing position, a locking device associated with each circuit breaker and designed for preventing in opposition to said energy accumulator the closing movement of said movable contact, each of said locking devices having a latch for blocking said contact in its open position and a magnetic winding for releasing said latch, a variable impedance connected in series with each circuit breaker, said impedance being designed for periodically increasing its impedance value at low intensities of the current to be interrupted, an auxiliary transformer having one primary winding for each of said circuit breakers and a common secondary winding, an amplifier having its input side connected with said secondary winding and its output side connected with said magnetic windings of said locking devices, and a control circuit allotted to each circuit breaker, said control circuit being arranged in parallel relation to the contacts of said breaker and connected to one of said primary windings in order to cause the release of said latches by said magnetic windings in response to the occurrence of a discharge current of a given minimum intensity between the opening contacts of said parallel arranged circuit breaker.

13. An arrangement for periodically interrupting alternating current, particularly for the purpose of rectifying alternating current, converting direct current into alternating current or converting alternating current of one frequency into alternating current of another frequency, comprising for each phase of the current to be interrupted a circuit breaker having reciprocatory contacts, a driving mechanism for periodically moving said contacts successively into their open position in synchronism with the current to be interrupted, means provided on said circuit breakers for returning said contacts to their closing position, a latch disposed on each circuit breaker for blocking the movable contact of said circuit breaker in its open position in opposition to said returning means, a magnetic winding disposed for each of said latches and designed for operating said latch, an inductor series-connected with each of said circuit breakers, said inductor having a magnetic body designed to be desultorily saturated at low current intensities so as to increase the inductance of said inductor during a time interval including the zero value of said current to be interrupted, at least one control circuit arranged in parallel relation to the contacts of one of said circuit breakers so as to be responsive to discharge currents between the opening contacts of said breaker, an auxiliary transformer having a primary winding connected to said control circuit, a grid controlled discharge vessel having its grid circuit connected with the secondary winding of said transformer and its anode circuit connected to said magnetic windings, the grid circuit of said discharge vessel being adapted to normally maintain a grid voltage below the operating voltage of said vessel and to increase said voltage to an operating value in dependency upon the energizing of said primary winding by said control circuit.

14. An arrangement for periodically interrupting alternating current, particularly for the purpose of rectifying alternating current, converting direct current into alternating current or converting alternating current of one frequency into alternating current of another frequency, comprising for each phase of the current to be interrupted a circuit breaker having reciprocatory contacts, a driving mechanism for periodically moving said contacts successively into their open position in synchronism with the current to be interrupted, an energy accumulator provided on each of said circuit breakers for returning said contact into closing position, a locking device associated with each circuit breaker and designed for preventing in opposition to said energy accumulator the closing movement of said movable contact, each of said locking devices having a latch for blocking said contact in its open position and two magnetic windings for releasing said latch, an energizing circuit connected with one of said two magnetic windings of each locking device, a starting switch disposed in said energizing circuit, means coupling said switch with said driving mechanism in order to actuate said switch for energizing said magnetic windings connected therewith in a given time relation with respect to the operation of said driving mechanism, and a control circuit arranged in parallel to the contacts of at least one of said circuit breakers, said control circuit being electrically coupled with the other of said two magnetic windings of each locking device so as to cause said latch to block said movable contact upon the occurrence of a discharge current of a given minimum intensity between the opening contacts of said parallel arranged circuit breaker.

FLORIS KOPPELMANN.
HANS JOACHIM MATTERN.